US009363662B2

United States Patent
Hur et al.

(10) Patent No.: US 9,363,662 B2
(45) Date of Patent: Jun. 7, 2016

(54) PORTABLE TERMINAL ON WHICH MULTIPLE SIMS ARE CAPABLE OF BEING MOUNTED, AND METHOD OF SELECTING SIM THEREIN

(71) Applicant: Samsung Electronics Co., Ltd., Gyeonggi-do (KR)

(72) Inventors: Man-Gun Hur, Daegu (KR); Jin-Woo Lee, Gyeongsangbuk-do (KR); Yong-Jin Kim, Daegu (KR); Sung-Kyu Oh, Busan (KR)

(73) Assignee: Samsung Electronics Co., Ltd. (KR)

( * ) Notice: Subject to any disclaimer, the term of this patent is extended or adjusted under 35 U.S.C. 154(b) by 111 days.

(21) Appl. No.: 14/136,699

(22) Filed: Dec. 20, 2013

(65) Prior Publication Data

US 2014/0179373 A1    Jun. 26, 2014

(30) Foreign Application Priority Data

Dec. 20, 2012    (KR) .................. 10-2012-0149537

(51) Int. Cl.
*H04B 1/3816*    (2015.01)
*H04W 8/18*    (2009.01)

(52) U.S. Cl.
CPC .............. *H04W 8/183* (2013.01); *H04B 1/3816* (2013.01)

(58) Field of Classification Search
CPC .................................................... H04B 1/3816
See application file for complete search history.

(56) References Cited

U.S. PATENT DOCUMENTS

| | | | |
|---|---|---|---|
| 8,576,901 B2* | 11/2013 | Tat ......................... | H04W 88/06 341/173 |
| 2005/0075106 A1* | 4/2005 | Jiang ................. | H04M 3/42263 455/432.3 |
| 2009/0305737 A1 | 12/2009 | Bae et al. | |
| 2011/0117965 A1* | 5/2011 | Gong .................... | H04W 48/18 455/558 |
| 2011/0269503 A1 | 11/2011 | Park et al. | |
| 2012/0135715 A1* | 5/2012 | Kang .................... | H04W 8/183 455/412.1 |
| 2013/0178187 A1* | 7/2013 | Middleton ........ | H04M 1/72563 455/405 |
| 2013/0225123 A1* | 8/2013 | Adjakple ............. | G06Q 20/322 455/406 |
| 2014/0106747 A1* | 4/2014 | Josso .................... | H04W 88/06 455/435.2 |
| 2015/0057046 A1* | 2/2015 | Challa .................. | H04W 4/001 455/558 |

FOREIGN PATENT DOCUMENTS

KR    1020050022641    3/2005

* cited by examiner

*Primary Examiner* — Asghar Bilgrami
(74) *Attorney, Agent, or Firm* — The Farrell Law Firm, P.C.

(57) ABSTRACT

A method of selecting a Subscriber Identity Module (SIM) in a portable terminal on which multiple SIMs are capable of being mounted, includes determining whether an application/service that is currently being executed is an application or a service for which security is previously set, selecting a SIM that is previously set for security use or a SIM that is set for general use, according to a result of the determination, and performing communication.

11 Claims, 4 Drawing Sheets

PORTABLE TERMINAL ON WHICH MULTIPLE SIMS ARE CAPABLE OF BEING MOUNTED, AND METHOD OF SELECTING SIM THEREIN

PRIORITY

This application claims priority under 35 U.S.C. §119(a) to Korean Patent Application Ser. No. 10-2012-0149537, which was filed in the Korean Intellectual Property Office on Dec. 20, 2012, the contents of which are incorporated herein by reference.

BACKGROUND OF THE INVENTION

1. Field of the Invention

The present invention relates generally to portable terminals, and more particularly, to a portable terminal on which multiple Subscriber Identity Modules (SIMs) are capable of being mounted, and a method of selecting a SIM from the multiple SIMs.

2. Description of the Related Art

Conventionally, a SIM is a card which can be used in a portable terminal, such as a smart phone, a mobile phone, a Portable Multimedia Player (PMP), a Moving Picture Experts Group (MPEG) Audio Layer 3 (MP3) player, and a personal navigation device, and stores personal information in order to enable the provision of various services, such as the authentication of a subscriber, charging a fee, and security functions. The SIM has been developed in order to enable a user to freely use mobile communication by using his/her own telephone number in any area regardless of mobile communication technology standards, such as a Code Division Multiple Access (CDMA) scheme and a Global System for Mobile Communication (GSM) scheme.

The SIM can be manufactured in the form of a smart card, and can be inserted into a portable terminal that, when booted, performs an initialization process including an authentication process by reading subscriber information stored in the SIM. The portable terminal can be used only with an authenticated SIM. Typically, a portable terminal that can use one SIM has been mainly used, but a Dual SIM Dual Standby (DSDS) portable terminal, which can combine and use multiple SIMs together, has recently been introduced. The DSDS portable terminal can combine and use together two SIMs of two different business operators or an identical business operator. Accordingly, the user can use two telephone numbers in one DSDS portable terminal.

In the portable terminal on which the multiple SIMs can be mounted as described above, a SIM is used in such a manner as to be selectively set according to the user's need, among the multiple SIMs. For example, the multiple SIMs may be distinguished as a main SIM and a subordinate SIM according to the user's setting. The two SIMS are combined and used together because a service charging system is different for each business operator and for each region, and use (e.g., business use/personal use) is different for each SIM. Accordingly, the user changes the setting of the main SIM and the subordinate SIM, and thereby can use a SIM of a business operator having a charging system satisfying the user, and can use the SIM suitable for the user's purposes.

In this regard, a particular application or service may be executed by using only a SIM of a particular type, or it may be more appropriate to select the SIM of the particular type. However, a great deal of inconvenience is caused when the user directly and manually changes the setting of a SIM depending on an application/service, as described above.

SUMMARY OF THE INVENTION

The present invention has been made to address at least the above-mentioned problems and/or disadvantages and to provide at least the advantages described below. Accordingly, an aspect of the present invention is to provide a portable terminal on which multiple SIMs are capable of being mounted, and a method of selecting a SIM therein, which can more conveniently select the SIM and can automatically select an appropriate SIM for each application/service.

In accordance with an aspect of the present invention, a method of selecting a SIM in a portable terminal on which multiple SIMs are capable of being mounted includes determining whether an application or a service is preset, selecting a preset first SIM according to a result of the determination, and performing communication.

In accordance with another aspect of the present invention, a method of selecting a SIM in a portable terminal on which multiple SIMs are capable of being mounted includes determining whether a current operating mode is a normal mode or a security mode, performing communication through a SIM, which is previously set for security use, with respect to data requiring security, when a result of the determination shows that the current operating mode is the security mode, and performing communication through a SIM that is previously set for general use, when the result of the determination shows that the current operating mode is the normal mode.

In accordance with another aspect of the present invention, a portable terminal on which multiple SIMs are capable of being mounted includes a mobile communication unit that processes a wireless signal for a mobile communication function, at least two SIM interfaces to which at least two SIMs are mounted, and a controller that determines whether an application or a service is preset, selects a preset first SIM or a preset second SIM from among the at least two SIMs, and controls an operation of performing communication through the mobile communication unit.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Hereinafter, various embodiments of the present invention will be described in detail with reference to the accompanying drawings. Various specific definitions found in the following description are provided only to assist in a general understanding of the present invention, and it is apparent to those skilled in the art that the present invention can be implemented without such definitions. Descriptions of well-known functions and constructions may be omitted for clarity and conciseness.

Figure 1:
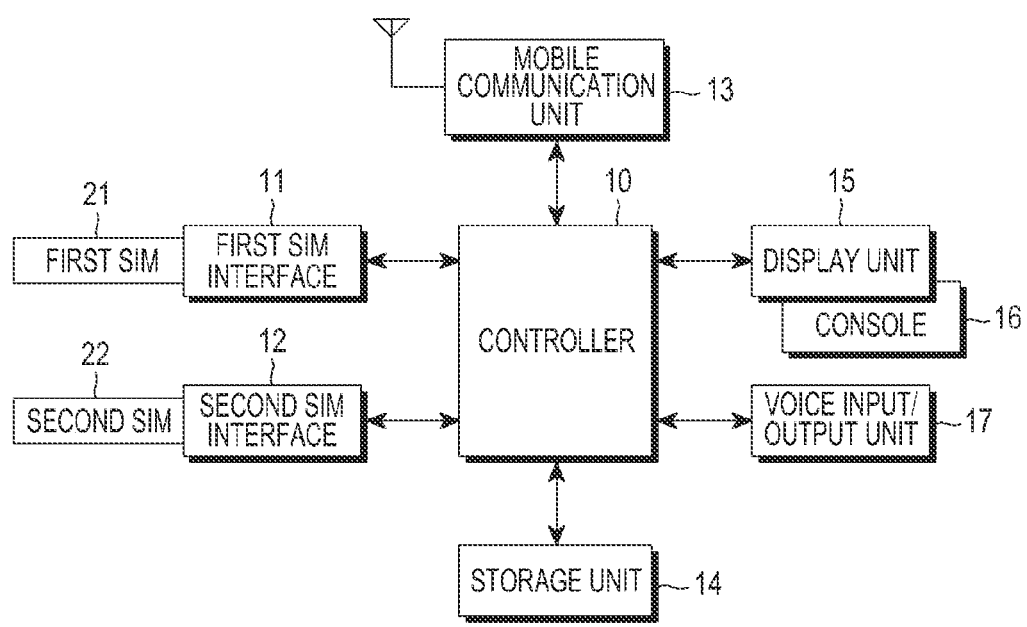
FIG. 1 illustrates an overall configuration of a portable terminal on which multiple SIMs are capable of being mounted, according to an embodiment of the present invention.

FIG. 1 illustrates an overall configuration of a portable terminal on which multiple SIMs are capable of being mounted, according to an embodiment of the present invention. Referring to FIG. 1, the portable terminal includes a first SIM 21, a second SIM 22, a first SIM interface 11, a second SIM interface 12, a controller 10, a mobile communication unit 13, a storage unit 14, a display unit 15, a console 16, and a voice 10 input/output unit 17.

The following will describe the portable terminal illustrated in FIG. 1 as a portable terminal that can be used with multiple SIMs mounted therein. Accordingly, the portable terminal according to an embodiment of the present invention may include two or more SIMs including a first SIM 21 and a second SIM 22. The first SIM 21 and the second SIM 22 may be mounted on and removed from (e.g., attached to and detached from) the portable terminal through SIM mounting slots or the first SIM interface 11 and the second SIM interface 12 each formed in a socket structure, which are respectively matched to the first SIM 21 and the second SIM 22.

The first SIM 21 and the second SIM 22 are smart cards of a DSDS portable terminal. The portable terminal according to an embodiment of the present invention is capable of performing communication through each of the two SIMs. In this case, the first SIM 21 may be a smart card supporting a first communication network, such as Long Term Evolution (LTE), and the second SIM 22 may be a smart card supporting a second communication network, such as Wideband Code Division Multiple Access (WCDMA) and Global System for Mobile Communication (GSM). Accordingly, the first SIM 21 and the second SIM 22 respectively include subscriber information and authentication information used for LTE communication and subscriber information and authentication information used for GSM communication, and each of the first SIM 21 and the second SIM 22 may include record information related to the relevant wireless communication.

The mobile communication unit 13 processes a wireless signal for a mobile communication function, and may include an antenna, a Radio Frequency (RF) unit (not shown) and a modulator/demodulator (modem) (not shown). The RF unit includes, for example, an RF transmitter for upconverting the frequency of a signal to be transmitted and then amplifying the frequency-upconverted signal, and an RF receiver for low-noise amplifying a received signal and then downconverting the frequency of the low-noise amplified signal. The modem includes, for example, a transmitter for encoding and modulating a signal to be transmitted, and a receiver for demodulating and decoding a signal received by the RF unit. Typically, the mobile communication unit 13 includes multiple antennas, and thus is capable of supporting all of LTE, WCDMA and GSM.

The display unit 15 typically includes a screen implemented by a Liquid Crystal Display (LCD), and/or an Organic Light-Emitting Diode (OLED) such as a Passive Matrix Organic LED (PMOLED) or an Active Matrix Organic LED (AMOLED), and displays such information as execution images, various operation states, and a menu state of various application programs of the relevant portable terminal. The display unit 15 may be integrated into a touch screen.

The console 16 includes the touch screen (not shown) and a touch screen controller (not shown), which are related to the display unit 15, and receives inputs corresponding to various gestures on the touch screen, such as a touch of the user's finger and a touch of an electronic pen. The console 16 includes multiple buttons (not shown) for manipulating multiple actions, which are mechanically provided to a keypad or an outer housing of the relevant portable terminal, and receives an input corresponding to a manipulation of the user.

The voice input/output unit 17 includes a speaker (not shown), a microphone (not shown), and a voice codec (not shown) that processes audio signals which are input and output through the speaker and the microphone, for example. When a telephone call according to a mobile communication function is performed, the voice input/output unit 17 receives a voice of the user as input or outputs an audible sound to the user, and also outputs processing sounds matched to various operations and sounds which are matched to various contents, such as digital audio and moving image contents.

The storage unit 14 includes, for example, a program memory (not shown) and a data memory (not shown), which store various contents or various application programs and contents related to the various application programs, and data related to operation processing. The program memory stores programs for controlling typical operations of the portable terminal. According to an embodiment of the present invention, the storage unit 14 may additionally store an operation program for selecting a SIM.

The controller 10 controls an overall operation of the portable terminal by collectively controlling the functional units, and is capable of changing and controlling an operation of the portable terminal according to a user input which is input through the console 16. The controller 10 determines whether an application/service that is currently being executed is an application/service for which security is previously set. According to a result of the determination, the controller 10 selects a SIM that is previously set for security use or a SIM that is set for general use, and controls an operation for performing communication. Detailed operations of the controller 10 will be described below.

Although not shown in FIG. 1, the portable terminal includes conventional functional units, such as a power supply unit including a rechargeable battery, a Global Positioning System (GPS) unit, a vibration motor, and a motion sensor that detects the state of motion of the relevant portable terminal.

Figure 2:
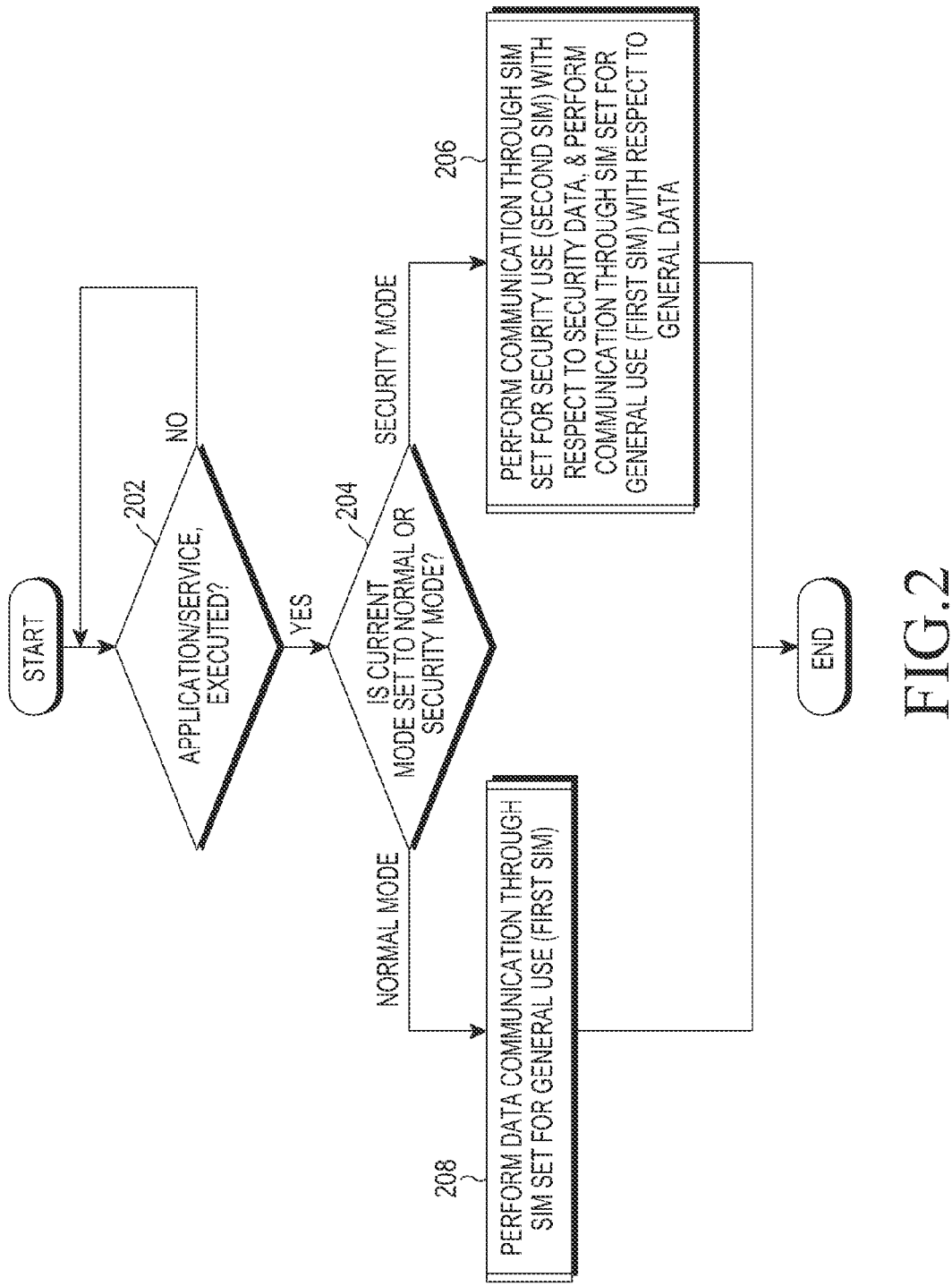
FIG. 2 is a flowchart illustrating a method of selecting a SIM in a portable terminal on which multiple SIMs are capable of being mounted, according to an embodiment of the present invention.

FIG. 2 is a flowchart illustrating a method of selecting a SIM in a portable terminal on which multiple SIMs are capable of being mounted, according to an embodiment of the present invention. The method illustrated in FIG. 2 is performed under the control of the controller of the portable terminal illustrated in FIG. 1. Referring to FIG. 2, when a user executes an application or a service provided to the relevant portable terminal by using a gesture on the touch screen, for example, the process determines in step 202 whether the application or service is executed, and proceeds to step 204 when the application or service is executed.

In step 204, the process determines whether a preset operating mode of the relevant portable terminal is currently a normal mode or a security mode. When the currently set operating mode is the security mode, the process proceeds to step 206.

When the currently set operating mode is the normal mode, the process proceeds to step 208. The normal mode and the security mode are preset in order to automatically select a SIM in the relevant operating mode, according to an embodiment of the present invention. The normal mode and the security mode, for example, are set in order to distinguish between the use of the portable terminal having a dual SIM for personal purposes in the normal mode, and the use thereof for business purposes in the security mode. The normal mode and the security mode may be configured to be set according to the user's selection in a separate menu environment. Alternatively, each application/service may be stored to be distinguished as security use or general use, and the normal mode and the security mode may be configured to be automatically set when the relevant application or service is executed or performed.

In step 206, to which the process has proceeded when the currently set operating mode is the security mode, with respect to data requiring security (i.e., security data), communication is performed through a SIM (e.g., the second SIM) which is previously set for security use according to the user's selection in a menu environment. With respect to general data, communication is performed through a SIM (e.g., the first SIM) that is previously set for general use according to the user's selection in the menu environment.

The security data is an application that is previously set as requiring security, or is data transmitted when a service is performed. For example, the application that is previously set as requiring security may be an application for business use, known as a "container", and for example, may be an application such as a Virtual Private Network (VPN) and an e-mail, which are included in a relevant container. The application for business use is previously distinguished as requiring security from time it is installed, and is installed for inclusion in the container. As described above, data related to the application included in the container is considered as security data.

In step 208, the process selects a SIM (e.g., the first SIM), which is previously set for general use in an environment of selecting a user menu, and performs all communications through the relevant SIM.

As noted in the method illustrated in FIG. 2, when the security mode is set, with respect to security data, a SIM (e.g., the second SIM) for which security is set is selected, and communication is performed through the selected SIM. With respect to general data, when setting the normal mode, a SIM (e.g., the first SIM) that is set for general use is selected, and communication is performed through the selected SIM. Accordingly, a fee is charged when the first SIM operates in cooperation with a first communication network, such as LTE. Otherwise, a fee is charged when the second SIM operates in cooperation with a second communication network, such as WCDMA or GSM.

In order to enable the selection of a SIM (i.e., the selection of the first SIM or the second SIM according to security/general data), for example, when the first SIM supporting LTE is idle/connected, the paging monitoring of the second SIM supporting WCDMA or GSM needs to be performed. Similarly, when the second SIM is idle/connected, the paging monitoring of the first SIM needs to be performed. Alternatively, when both the first SIM and the second SIM support WCDMA, WCDMA paging monitoring of the other SIM is performed during a Packet Service (PS) of each SIM.

Figure 4:
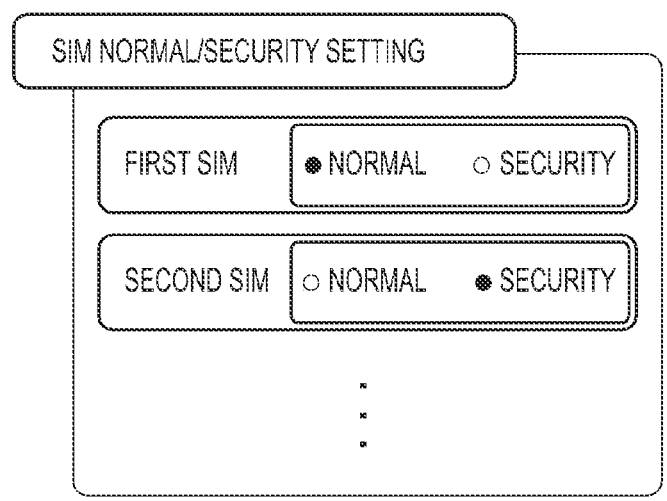
FIG. 4 illustrates an example of a menu screen for setting a SIM in a portable terminal on which multiple SIMs are capable of being mounted, according to another embodiment of the present invention.

In the above case, each of the first SIM and the second SIM may be set for security use or for general use according to the user's selection in a separately-preset menu environment, as illustrated in FIG. 4 which is an example of a menu screen for setting a SIM in a portable terminal on which multiple SIMs are capable of being mounted, according to another embodiment of the present invention.

As illustrated in FIG. 4, in an environment setting-related menu of the relevant portable terminal, the so-called "SIM normal/security setting" menu can be previously arranged. In the relevant menu, normal/security can be previously set for the first SIM and the second SIM, according to the user's selection. The controller of the portable terminal stores information on the setting of normal/security selected by the user of the SIMs in an internal memory thereof or an external memory connected thereto, and identifies the relevant information when a SIM is selected.

Referring back to FIG. 2, when the security mode is set, with respect to security data, a SIM (e.g., the second SIM) for which security is set is selected, and communication is performed through the selected SIM. With respect to general data, when setting the normal mode, a SIM (e.g., the first SIM) that is set for general use is selected, and communication is performed through the selected SIM. In another embodiment of the present invention, which is a modification of the embodiment illustrated in FIG. 2, in the security mode, with respect to all data (i.e., security data and general data), communication may be performed only through the SIM (e.g., the second SIM) for which security is set.

Figure 3:
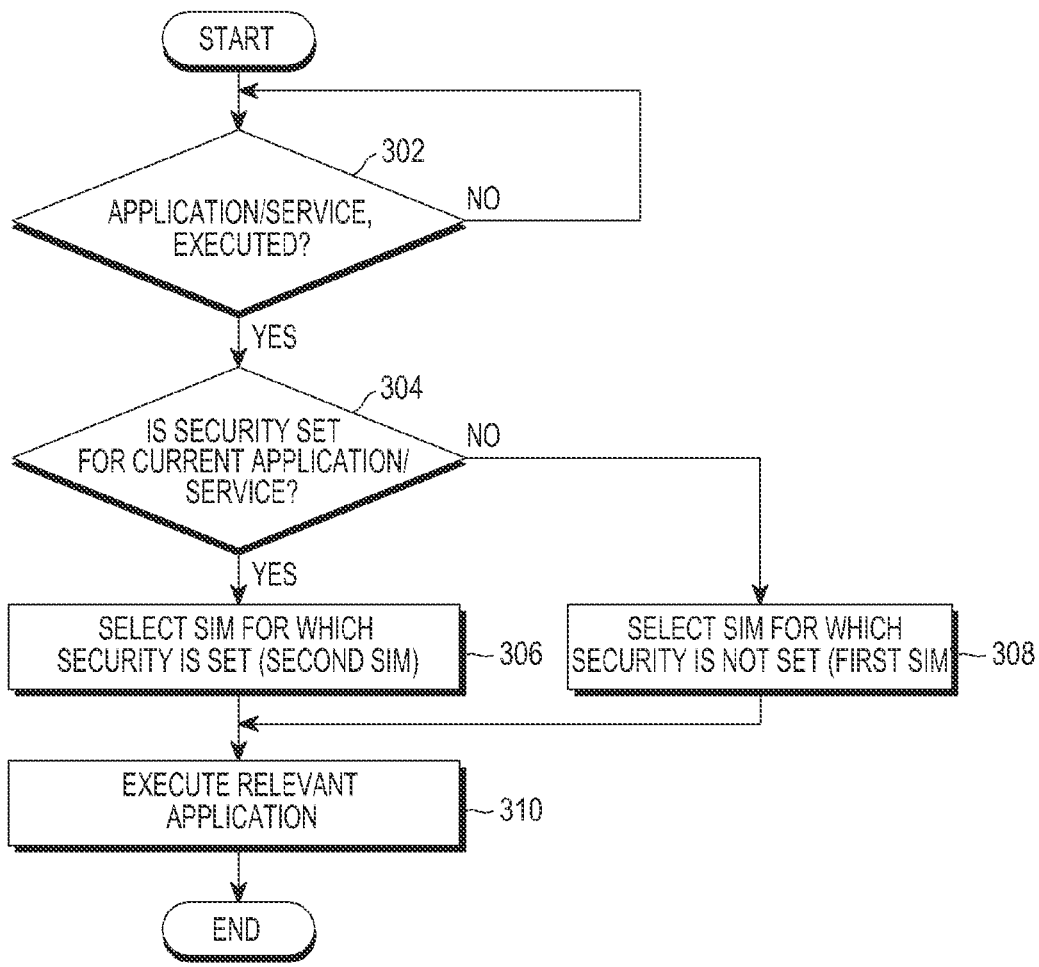
FIG. 3 is a flowchart illustrating a method of selecting a SIM in a portable terminal on which multiple SIMs are capable of being mounted, according to another embodiment of the present invention.

FIG. 3 is a flowchart illustrating a method of selecting a SIM in a portable terminal on which multiple SIMs are capable of being mounted according to another embodiment of the present invention. The method illustrated in FIG. 3 is performed under the control of the controller of the portable terminal illustrated in FIG. 1. Referring to FIG. 3, when a user executes an application or a service provided to the relevant portable terminal by using a gesture on the touch screen, for example, it is determined in step 302 whether the application or service is executed, and the method proceeds to step 304 when the application or service is executed.

In step 304, it is determined whether an application/service that is currently being executed is an application/service for which security is previously set. Such a determination operation may be to merely determine whether the application/service that is currently being executed is included in a container. When a result of the determination in step 304 is that the application/service that is currently being executed is set for security use, the method proceeds to step 306, and a SIM (e.g., the second SIM) for which security is set is selected. When the application/service that is currently being executed is not set for security use, the method proceeds to step 308, and a SIM (e.g. the first SIM) that is set for general use is selected.

After the SIM is selected in step 306 or in step 308, in step 310, the relevant application/service is executed or performed through the selected SIM.

As noted in the method illustrated in FIG. 3, when an application/service for which security is set is executed, a SIM for which security is set is automatically selected, and data is transmitted through the relevant SIM. In contrast, when a general application/service for which security is not set is executed, a SIM that is set for general use is automatically selected, and data is transmitted through the relevant SIM.

According to another embodiment of the present invention, the selection of a SIM may be (temporarily) changed by performing LTE, GSM or WCDMA paging monitoring of the other SIM during a PS of each selected SIM, as in the embodiment illustrated in FIG. 2.

As described above, the configuration and the operation relates to the portable terminal on which multiple SIMs are capable of being mounted, and the method of selecting a SIM therein, according to an embodiment of the present invention.

The portable terminal on which multiple SIMs are capable of being mounted, and the method of selecting a SIM therein can more conveniently select the SIM and can automatically select an appropriate SIM for each application/service, according to the present invention.

It will be appreciated that the embodiments of the present invention may be implemented in a form of hardware, software, a combination of hardware and software. Regardless of being erasable or re-recordable, such an optional software may be stored in a non-volatile storage device such as a Read-Only Memory (ROM), a memory such as an Random Access Memory (RAM), a memory chip, a memory device, or an integrated circuit, or a storage medium such as a Compact Disc (CD), a Digital Video Disc (DVD), a magnetic disc, or a magnetic tape that is optically or electromagnetically recordable and readable by a machine, for example, a computer.

It will be appreciated that a memory, which may be incorporated in a portable terminal, may be an example of a machine-readable storage medium that is suitable for storing a program or programs including commands to implement the embodiments of the present invention. Therefore, embodiments of the present invention provide a program including codes for implementing a system or method claimed in any claim of the accompanying claims and a machine-readable device for storing such a program. Moreover, such a program as described above can be electronically transferred through an arbitrary medium such as a communication signal transferred through cable or wireless connection, and the present invention properly includes the things equivalent to that.

While the present invention has been shown and described with reference to certain embodiments thereof, various changes in form and details may be made therein without departing from the spirit and scope of the present invention.

What is claimed is:

1. A method of selecting a Subscriber Identity Module (SIM) in a portable terminal on which multiple SIMs are capable of being mounted, the method comprising:
    determining whether an application or a service is executed;
    identifying, when the application or the service is executed, a predetermined setting of security of the application or the service; and
    selecting a SIM among the multiple SIMs according to a result of the identified setting of security, and performing communication using the selected SIM.

2. The method as claimed in claim 1, wherein paging monitoring of a communication network of another SIM other than the selected SIM, is performed when the communication is performed using the selected SIM.

3. The method as claimed in claim 1, wherein the selected SIM is preset for security use according to selection of a user in a user menu environment.

4. The method as claimed in claim 1, wherein the application or the service for which the security is previously set is for business use.

5. A method of selecting a Subscriber Identity Module (SIM) in a portable terminal on which multiple SIMs are capable of being mounted, the method comprising:
    determining whether a current operating mode is a normal mode or a security mode;
    performing communication through a second SIM, which is previously set for security use in a user menu environment, with respect to data requiring security, when determining that the current operating mode is the security mode; and
    performing communication through a first SIM that is previously set for general use in the user menu environment, when determining that the current operating mode is the normal mode.

6. The method as claimed in claim 5, wherein communication is performed through the first SIM, with respect to general data, when determining that the current operating mode is the security mode.

7. The method as claimed in claim 5, wherein paging monitoring of a communication network of the first SIM is performed when the communication is performed through the second SIM, and paging monitoring of a communication network of the second SIM is performed when the communication is performed through the first SIM.

8. The method as claimed in claim 5, wherein the normal mode or the security mode is set according to selection of a user in a separate menu environment, or is set in a manner that identifies each application/service as being for the security use or the general use.

9. A portable terminal on which multiple Subscriber Identity Modules (SIMs) are capable of being mounted, the portable terminal comprising:
    a mobile communication unit configured to process a wireless signal for a mobile communication function;
    at least two SIM interfaces to which at least two SIMs are mounted; and
    a controller configured to determine whether an application or a service is executed, identify, when the application or the service is executed, a predetermined setting of security of the application or the service, select a preset first SIM or a preset second SIM from among the at least two SIMs based on the identified setting of security, and control an operation of performing communication through the mobile communication unit.

10. The portable terminal as claimed in claim 9, wherein the controller performs paging monitoring of a communication network of the first SIM when the controller selects the second SIM of the at least two SIMs, and performs paging monitoring of a communication network of the second SIM, when the controller selects the first SIM of the at least two SIMs.

11. The portable terminal as claimed in claim 9, wherein each of the first SIM and the second SIM is previously set for security use or for general use according to selection of a user in a user menu environment.

* * * * *